(12) United States Patent
Fujimura et al.

(10) Patent No.: US 6,669,099 B2
(45) Date of Patent: Dec. 30, 2003

(54) MEMORY CARD

(75) Inventors: Masatsugu Fujimura, Uda-gun (JP); Takashi Yasudome, Tenri (JP); Takashi Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 79 days.

(21) Appl. No.: 09/893,571

(22) Filed: Jun. 29, 2001

(65) Prior Publication Data

US 2002/0000474 A1 Jan. 3, 2002

(30) Foreign Application Priority Data

Jun. 30, 2000 (JP) .................................... 2000-200266

(51) Int. Cl.[7] ............................ G06K 5/00; G06K 19/06
(52) U.S. Cl. .................... 235/492; 235/380; 235/441
(58) Field of Search ................................. 235/492, 436, 235/437, 441, 380, 382; 710/5, 2, 14; 700/31

(56) References Cited

U.S. PATENT DOCUMENTS

| | | | | | |
|---|---|---|---|---|---|
| 5,938,750 A | * | 8/1999 | Shaberman | ................. | 710/301 |
| 6,209,043 B1 | * | 3/2001 | Sanemitsu | ..................... | 710/5 |
| 2002/0000474 A1 | * | 1/2002 | Fujimura et al. | ........... | 235/492 |

FOREIGN PATENT DOCUMENTS

JP  A11328009  11/1999

* cited by examiner

*Primary Examiner*—Thien M. Le
(74) *Attorney, Agent, or Firm*—Birch, Stewart, Kolasch & Birch, LLP

(57) ABSTRACT

A memory card connected to a host system includes a command detection section for detecting an identification code transmission request command which is input from the host system and an identification code control section for outputting to the host system, in response to a detection signal output from the command detection section, a predetermined identification code which indicates compatibility of the memory card with the host system.

4 Claims, 4 Drawing Sheets

MEMORY CARD

BACKGROUND OF THE INVENTION

1. Field of the Invention

The present invention relates to a memory card used with a host system, such as an information processing device, connected thereto.

2. Description of the Related Art

In general, a memory card is used while being connected to a host system which processes information. The memory card is connected to the host system such that the host system can store, read, or overwrite data in the memory card. For such a memory card, for example, a flash memory is used. Only when the host system checks a device ID stored in the memory card and determines that the memory card is compatible with the host system, the host system can read, write, or delete data in the memory card.

FIG. 3 is a block diagram illustrating a first exemplary configuration of a conventional memory card. In FIG. 3, a memory card 101 includes a component memory section 102 in which data can be overwritten, and a card control section 103 which includes a bus buffer, an address decoder, etc.

The component memory section 102 includes a command control-type memory section for storing a device ID. The device ID includes a manufacturer code (e.g., a code assigned to Sharp K.K. is B0H) and a device code (e.g., a code assigned to a 16Mb device is D0H, where every product type of device has its own device code).

The card control section 103 controls the component memory section 102 by using the address decoder, etc. A host system 100 outputs an address signal and a command signal to the memory card 101 through an address bus AB and a data bus DB, respectively. Based on these signals, the host system 100 writes data to a prescribed address in the component memory section 102 or reads data corresponding to a prescribed address from the component memory section 102.

When a reset signal RESET is input to the card control section 103, the card control section 103 outputs a reset signal RESET' to the component memory section 102 to put the component memory section 102 into a reset state. Note that there are generally two types of memory cards. A memory card of the first type is put into a reset state by a high-level signal. A memory card of the second type is put into a reset state by a low-level signal. In this conventional example, the memory card is put into a reset state by a high-level signal.

When a write enable signal WE# which is a write selection signal, a chip enable signal CE# which is a chip selection signal, and an output enable signal OE# which is a data output selection signal are input from the host system 100 to the card control section 103, the card control section 103 outputs a write enable signal WE#', a chip enable signal CE#', and an output enable signal OE#', respectively, to the component memory section 102. The symbol "#" indicates the inversion of a signal level, which means that a signal is active when low. This allows the component memory section 102 to be put into an active state by a low-level signal. The card control section 103 outputs the address signal and the command signal from the host system 100 to the component memory section 102 through the address bus AB and the data buses DB, DB', respectively. Based on these signals, the card control section 103 controls reading or writing of data corresponding to an address in the component memory section 102 which is designated by the address signal. In the case where data can be written in the component memory section 102, the write enable signal WE# is at a low level.

In the above described configuration, the host system 100 reads a device ID from the memory card 101 to check the device ID and to determine whether or not the memory card 101 is compatible with the host system 100 in the manner described below.

When the component memory section 102 is in a state such that data can be read therefrom ("read array mode"), the chip enable signal CE#, the write enable signal WE#, and the output enable signal OE#, which are output from the host system 100, are set to an active state (low level), an active state (low level), and an inactive state (high level), respectively.

Next, the host system 100 outputs an ID transmission request command, for example, 9090H, to the card control section 103 through the data bus DB, and then the card control section 103 outputs the ID transmission request command 9090H to the component memory section 102 through the data bus DB'.

The component memory section 102 recognizes the ID transmission request command 9090H output from the card control section 103, and outputs the device ID stored in the component memory section 102 to the card control section 103 through the data bus DB'. The card control section 103 outputs the device ID received from the component memory section 102 to the host system 100 through the data bus DB.

The host system 100 checks the device ID output from the memory card 101 to determine whether or not the memory card 101 is compatible with the host system 100. If the memory card 101 is determined to be compatible with the host system 100, operations such as reading or writing of data can be performed between the memory card 101 and the host system 100 according to command signals output from the host system 100. If the host system 100 determines otherwise, operations cannot be performed between the memory card 101 and the host system 100 according to command signals output from the host system 100.

The command signal is not limited to the ID transmission request command 9090H described above. A flash memory card which is available from Sharp K.K. accepts a reset command FFFFH, a status register read command 7070H, a status register clear command 5050H, a deletion command D0D0H, a write set-up command 4040H, a write command 1010H, etc.

In a memory card with simplified circuitry, the function of the card control section 103 may be limited to only a decode function which uses an address signal. In such a memory card, a bus width of the data bus DB' between the card control section 103 and the component memory section 102 may be fixed to 16 or 8 bits, and the component memory section 102 and the host system 100 may be directly connected to each other through the data bus DB. In this case, each of the signal lines for the write enable signal WE#, the output enable signal OE#, and the reset signal RESET between the host system 100 and the card control section 103 is directly connected to each of the corresponding signal lines for the write enable signal WE#', the output enable signal OE#', and the reset signal RESET' between the card control section 103 and the component memory section 102 without passing through the card control section 103.

When the component memory section 102 includes a plurality of memories, the card control section 103 has a function of decoding an upper bit portion of an address signal to select a memory with a corresponding address to the address signal.

In a memory card having the above-described conventional configuration, there is a case where the host system 100 checks the device ID output from the memory card 101 and determines that the memory card 101 is not compatible with the host system 100 even though they have compatibility of an algorithm with each other. In this case, operations between the host system 100 and the memory card 101 cannot be performed according to a command signal. As an example of solving such a problem, Japanese Laid-Open publication No. 11-328009 proposes "A MEMORY CARD AND A METHOD OF DETERMINING OPERATING COMPATIBILITY USING SUCH A MEMORY CARD". FIG. 4 illustrates a configuration of such a memory card.

FIG. 4 is a block diagram illustrating a second exemplary configuration of a conventional memory card. In FIG. 4, a memory card 201 includes an address decoder 202, first and second memories 203 and 204, a command decoder 205, a sequencer 206, a register 207, a status register 208, and a table storage section 209.

The address decoder 202 decodes an address signal input through an address bus AB from a host system 200, and outputs a chip enable signal CE# to the first memory 203 or the second memory 204. This allows the first memory 203 or the second memory 204 to be exclusively selected.

The first and second memories 203 and 204 receive a command signal output from the host system 200 through a data bus DB. The memory selected according to the chip enable signal CE# output from the address decoder 202, i.e., the first or second memory 203 or 204, operates according to the command signal input from the host system 200.

The command decoder 205 decodes a command signal input through the data bus DB, and outputs a trigger signal to the sequencer 206 based on the decoded result.

The sequencer 206 is activated by the trigger signal output from the command decoder 205 to control the register 207, the status register 208 and the table storage section 209. The register 207 is connected to the host system 200 through the data bus DB. The register 207 stores a device ID (a manufacturer code and device code) input from the host system 200. The table storage section 209 has a device ID table. The device ID table includes device IDs (a manufacturer code and device code) of IC memories which form the first and second memories 203 and 204 in a tabular format. A memory card including an IC memory which has a device ID identical to the device ID stored in the register 207 has operation compatibility with the host system 200. The sequencer 206 checks whether the device ID stored in the register 207 is included in the device ID table. If so, for example, a "00h" code is set in the status register 208, and if not, for example, an "FFh" code is set in the status register 208.

The register 207 is connected to the host system 200 through the data bus DB. The device ID (a manufacturer code and device code) input through the data bus DB is temporarily stored in the register 207 according to an instruction from the sequencer 206.

The status register 208 is connected to the host system 200 through the data bus DB. When the host system 200 reads the "00h" code from the status register 208, the host system 200 determines that the memory card 201, which includes the IC memories forming the first and second memories 203 and 204, has operation compatibility with the host system 200, and then performs an operation, such as reading, writing, or deleting of data in the memory card 201. When the host system 200 reads the "FFh" code from the status register 208, the host system 200 can only read data from the memory card 201.

The table storage section 209 has the device ID table. The device ID table includes device IDs (a manufacturer code and device code) of IC memories which form the first and second memories 203 and 204 in a tabular format. A memory card including an IC memory which has a device ID identical to the device ID stored in the register 207 has operation compatibility with the host system 200.

In the above-described configuration, the device ID table of the table storage section 209 prestores identification information (device IDs) which indicates compatibility of an algorithm with the first and second memories 203 and 204.

When the host system 200 notifies the memory card 201 of device IDs which are compatible with the host system 200, the memory card 201 determines whether or not the notified device IDs exist in the device ID table, and outputs the determination result (which represents presence/absence of such a device ID) to the host system 200.

The host system 200 checks the memory card 201 based on the determination result produced in the memory card 201 instead of the device ID in order to determine whether or not the memory card 201 is compatible with the host system 200. When the device ID table includes no device ID which is identical to any of the device IDs notified by the host system 200, the host system 200 determines that the memory card 201 is not compatible therewith.

In the above-described conventional memory card 101 of FIG. 3, many memories which can be used as the component memory section 102 have compatibility of an algorithm with the host system 100. However, even if such an algorithmically-compatible memory is used as the component memory section 102, when the device ID (a manufacturer code and device code) of the memory is not registered in the host system 100, the host system 100 determines that the memory card 101 including the algorithmically-compatible memory in the component memory section 102 is not compatible with the host system 100. Therefore, due to the determination result, the memory card 101 cannot be used with the host system 100 although the memory card 101 meets the requirements for use with the host system 100 except that the device ID is different.

The memory card 201 of FIG. 4 determines whether or not the device ID table includes a device ID of a memory which is compatible with the host system 200. The determination result is output to the host system 200. In the case where the memory card 201 is used with the host system 200, the host system 200 is required to have software with a function of detecting the determination result produced by the memory card 201. In this configuration, device IDs of memories which are compatible with the host system 200 are preregistered in the device ID table in the memory card 201. This is useful for the memory card 201 to be widely used and have wide application. However, when the host system 200 does not have a detection function as described above, and the host system 200 receives the device IDs of the component memory sections 203 and 204 output from the memory card 201 and determines whether or not the component memory sections 203 and 204 are compatible with the host system 200, the memory card 201 cannot be used with the host system 200. In the case where the host system 200 determines that the memory card 201 is not compatible therewith although the memory card 201 can actually be used with the host system 200, when a user desires to make the memory card 201 compatible with the host system 200, the user is required to update the software of the host system 200 or to modify a device included in the host system 200.

In general, even a memory which is of the newest model becomes an out-of-date product along with the development of the production process. In view of such an alternation of generations, the life span of a memory product is considered to be not more than approximately 10 years. On the other hand, the life span of the host system 200 is generally 10 years or more. Therefore, if the manufacturer stops producing the memories used by the memory card 201, the memory card 201 may not be supplied. In such a case, it is only necessary to make a change in software or hardware of the host system 200 so that a device ID of the component memory section 203 can be recognized by the host system 200. However, it is extremely difficult to make such a change in the software or hardware of a host system which is already on the market.

SUMMARY OF THE INVENTION

A memory card connected to a host system according to the present invention includes a command detection section for detecting an identification code (device ID) transmission request command which is input from the host system and an identification code control section for outputting to the host system, in response to a detection signal output from the command detection section, a predetermined identification code which indicates compatibility of the memory card with the host system, and thus an objective of the present invention can be achieved.

In general, a memory card including a memory, which has compatibility of an algorithm with a memory compatible with a host system and does not have an identification code which indicates compatibility of the memory card with the host system, can not be used with the host system. However, in the above-described configuration according to the present invention, the memory card may output an identification code which indicates compatibility of the memory card with the host system other than an identification code (e.g., device ID) preregistered in the memory card (e.g., in a component memory section) in response to an identification code (device ID) transmission request command which is input from the host system to the memory card, so that the memory card can identify itself to the host system as a memory card compatible with the host system. Therefore, the memory card may be used with the host system without changing software or hardware of the host system even if the memory used by the memory card becomes an out-of-date product along with developments in the design and production of the memory.

Moreover, the memory card according to the present invention may further include a component memory section for storing a device ID and an output conversion section for outputting, in response to the detection signal output from the command detection section, an output prohibition signal which prohibits the component memory section from outputting data.

In this configuration of the present invention, by detecting the identification code transmission request command, it is possible to readily switch output operation between the component memory section and the host system to output operation between the identification code control section and the host system. Therefore, when the command detection section detects the identification code transmission request command, an identification code stored in the identification code control section which indicates compatibility of the memory card with the host system may be automatically output to the host system instead of outputting an identification code (e.g., device ID) stored in the component memory section to the host system.

Moreover, the identification code control section in the memory card according to the present invention may include an identification code table for storing the predetermined identification code and an identification code output section for outputting the predetermined identification code stored in the identification code table to the host system.

In this configuration of the present invention, the memory card may prestore identification codes (e.g., device IDs) which indicate compatibility of the memory card with host systems in an identification table so as to selectively obtain an identification code desired by a user from the identification table.

Moreover, the identification code control section in the memory card according to the present invention may include an identification code table for storing a plurality of identification codes, a select circuit for selecting one of the plurality of identification codes stored in the identification code table and an identification code output section for outputting the identification code selected by the select circuit to the host system.

In this configuration of the present invention, the memory card may readily select a desired identification code corresponding to a host system to be used from a plurality of identification codes stored in an identification code table using a select circuit so as to output the selected identification code to the host system.

Moreover, the identification code used for the memory card according to the present invention may include a manufacturer code and a device code.

In this configuration of the present invention, various identification codes (e.g., device IDs), in which each identification code includes a manufacturer code and a device code of a memory, may be preset in an identification table, depending on a host system to be used, during production process, etc.

Thus, the invention described herein makes possible the advantages of providing a memory card which can be determined to be compatible with a host system by the host system without requiring any change in software or hardware of the host system even when the memory card, which has compatibility of an algorithm with a memory compatible with a host system, has a device ID which is different from a preregistered device ID.

These and other advantages of the present invention will become apparent to those skilled in the art upon reading and understanding the following detailed description with reference to the accompanying figures.

DESCRIPTION OF THE PREFERRED EMBODIMENTS

Hereinafter, a memory card according to the present invention will be described with reference to the accompanying figures.

Figure 1:
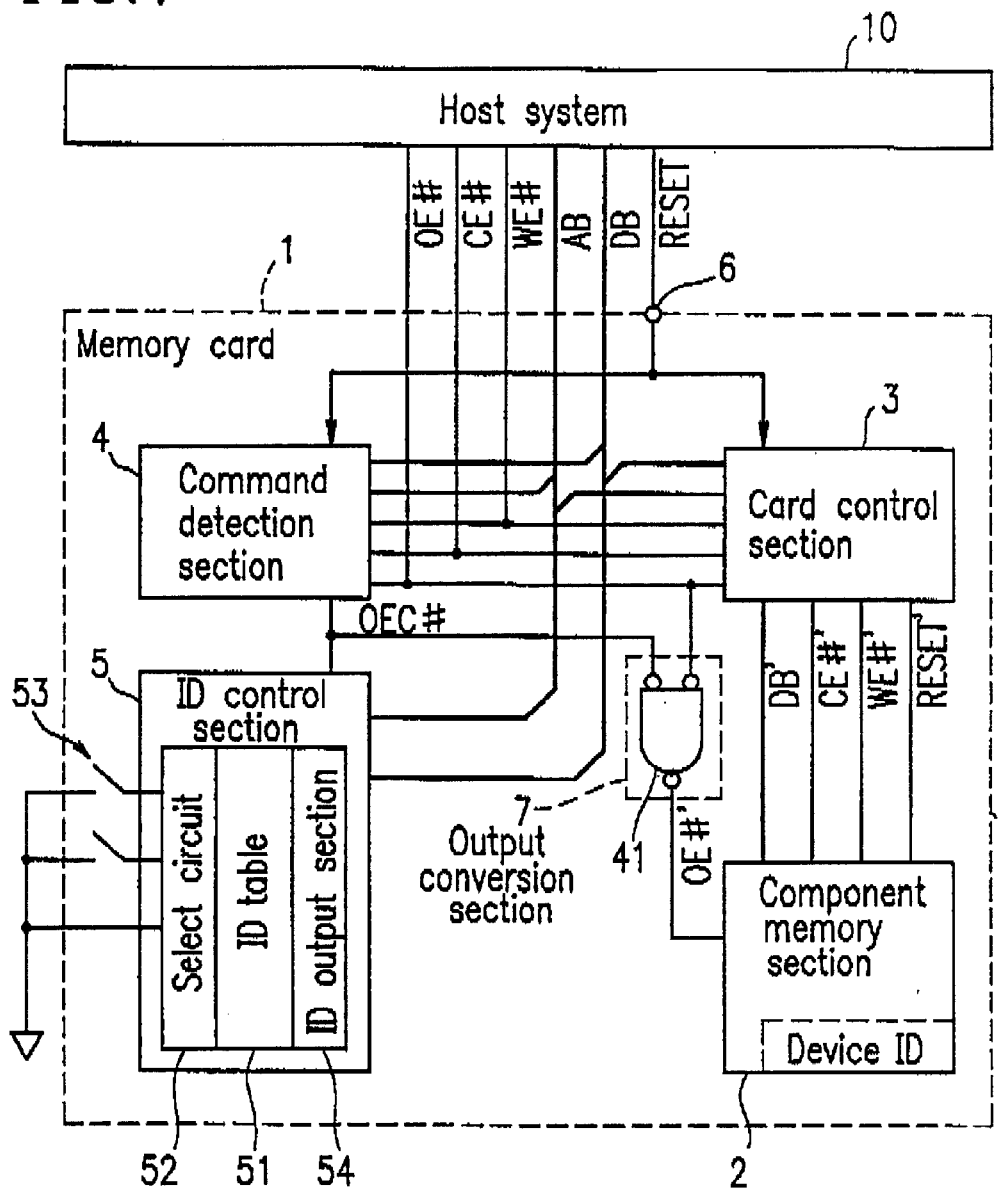
FIG. 1 is a block diagram illustrating an exemplary configuration of a memory card according to an embodiment of the present invention.

FIG. 1 is a block diagram illustrating a configuration example of a memory card according to an embodiment of the present invention. In FIG. 1, a memory card 1 includes: a component memory section 2 in which data can be overwritten; a card control section 3 which includes a bus buffer, an address decoder, etc.; a command detection section 4 for detecting an ID transmission request command signal (identification code transmission request command signal) output from a host system 10; and an ID control section 5 (identification code control section) for outputting an identification code in response to a signal output from the command detection section 4 when the command detection section 4 detects the ID transmission request command signal.

The component memory section 2 includes at least one command control-type memory. The component memory section 2 stores a device ID as an identification code therein, and data stored in the component memory section 2 can be overwritten. The device ID includes a manufacturer code and a device code.

Each of signal lines for a reset signal RESET, a write enable signal WE#, a chip enable signal CE#, and an output enable signal OE#, which are output from the host system 10, an address bus AB, and a data bus DB are connected to respective input terminals of the card control section 3. Each of the signal lines for a reset signal RESET', a write enable signal WE#', and a chip enable signal CE#', and a data bus DB' are connected between output terminals of the card control section 3 and corresponding input terminals of the component memory section 2. In this configuration, the component memory section 2 is put into an active state when the write enable signal WE#' and chip enable signal CE#' are both at a low level, while the component memory section 2 is put into a reset state when the reset signal RESET' is at a high level.

The component memory section 2 is put into an active state by the output enable signal OE#', the write enable signal WE#', and the chip enable signal CE#'. When the card control section 3 outputs an address signal, and write command and data signals which are input from the host system 10 through an address bus AB and a data bus DB, respectively, to the component memory section 2, data is written in an address designated by the address signal.

Moreover, the component memory section 2 is put into an active state by the output enable signal OE#', the write enable signal WE#', and the chip enable signal CE#'. When the card control section 3 outputs an address signal and a read command signal which are input from the host system 10 through an address bus AB and a data bus DB, respectively, to the component memory section 2, data is read from an address designated by the address signal through a data bus DB'.

When a component memory section includes a plurality of component memory sections 2, the card control section 3 has a function of decoding an address signal AD to select one of the component memory sections 2 and a function of controlling, based on the chip enable signal CE# and a least significant bit of the address signal AD, the data bus DB such that a bus width of the data bus DB is fixed to 16 or 8 bits.

The command detection section 4 only detects a device ID transmission request command output from the host system 10. When the command detection section 4 detects the ID transmission request command, the command detection section 4 outputs an output enable control signal OEC# (a low-level ID output permission signal) to the ID control section 5 and to one of input terminals of an OE# control OR gate 41 which is within an output conversion section 7. The output enable signal OE# may be input to the other input terminal of the OE# control OR gate 41. As described above, when the command detection section 4 detects the ID transmission request command, the command detection section 4 outputs the ID output permission signal (i.e., the low-level output enable control signal OEC#) to the ID control section 5 and the output conversion section 7. The ID output permission signal input to the output conversion section 7 is converted into an output prohibition signal (i.e., a high-level output enable signal OC#') by the OE# control OR gate 41 within the output conversion section 7. Then, the output conversion section 7 outputs the converted output prohibition signal to the component memory section 2. The output prohibition signal prohibits the component memory section 2 from outputting data.

The ID control section 5 includes an ID table 51 (identification code table), a select circuit 52 which includes an ID setting switch 53 (identification code setting section), and an ID output section 54 (identification code output section).

The ID table 51 is formed of either of a mask ROM, an EEPROM, or a flash ROM. In the case where the memory card 1 can be used for various types of the host systems 10, various device IDs of memories, which are compatible with the host system 10, are prestored in the ID table 51.

The select circuit 52 which includes the ID setting switch 53 selects, during the production process, a desired device ID from the plurality of the device IDs prestored in the ID table 51. The selection of the device ID is based on the setting of the ID setting switch 53 which is externally set during the production process. The device ID selected based on the such setting of the ID switch 53 by the select circuit 52 is sent from ID table 51 to the ID output section 54. The device ID to be sent is selected, based on the setting of the ID setting switch 53 during the production process of the memory card 1, from the device IDs of memories compatible with the host system 10 to be used, which are investigated in advance. In the case where the memory card 1 can be used with only one type of host system 10, the memory card 1 only needs to have the ID table 51 including one registered device ID of a memory compatible with that host system 10. In this case, the select circuit 52 is not required, thereby achieving a simplified circuitry configuration for the memory card 1.

The ID output section 54 is permitted to use the data bus DB by receiving the output enable control signal OEC#, so that the ID output section 54 may output the device ID selected from the ID table 51 to the host system 10 through the data bus DB.

The data output from the ID output section 54 is in the form of parallel data. For example, when a nonvolatile memory, such as a serial EEPROM, is used as an input section of the select circuit 52, data may be processed in the select circuit 52 so as to convert serial data into parallel data. Thereafter, the parallel data may be transmitted to the ID output section 54. With this configuration, the number of device terminals of the ID control section 5 can be reduced.

An operation of the memory card 1 having the above configuration will be described below.

Figure 2:
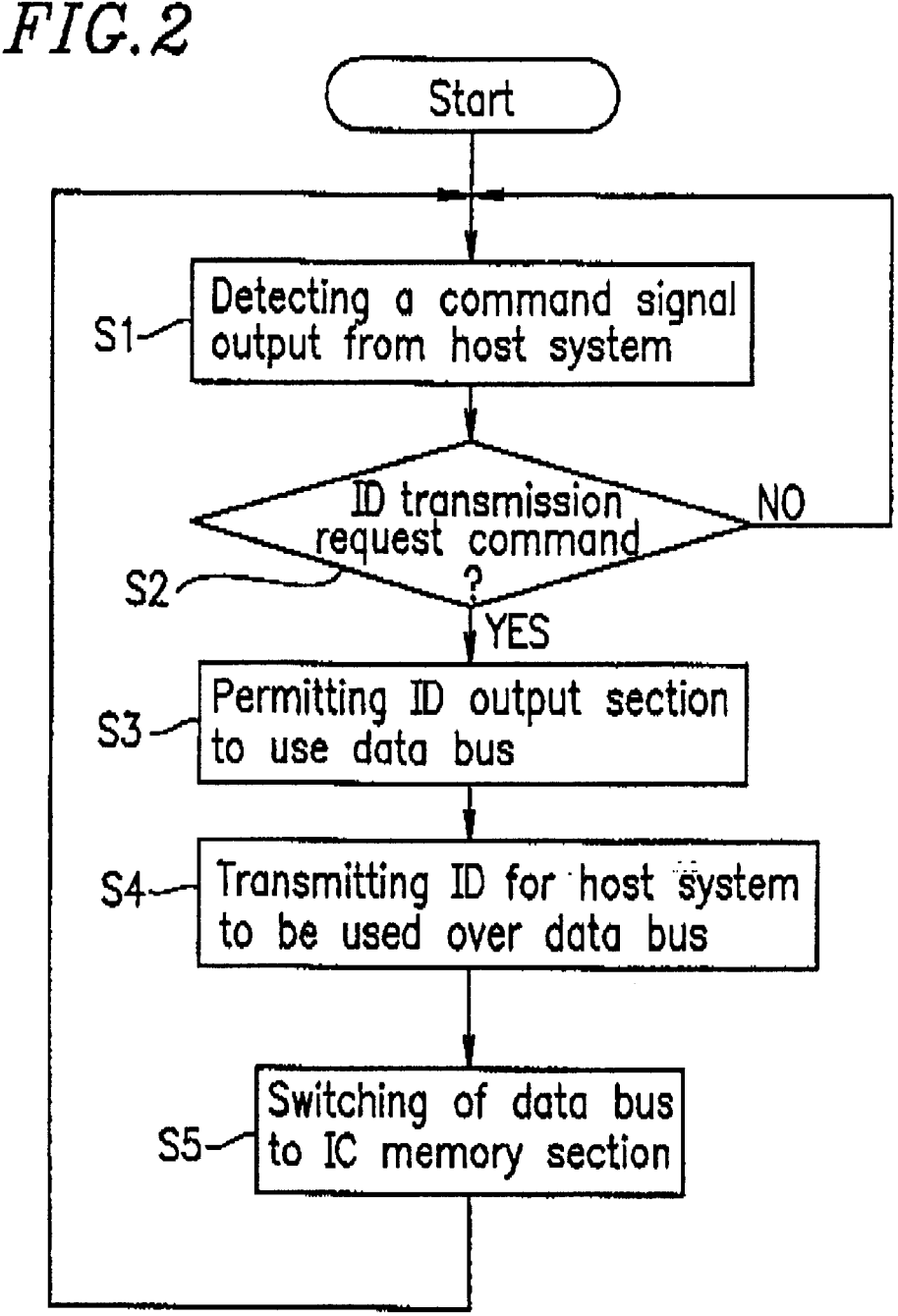
FIG. 2 is a flowchart illustrating a procedure in which a memory card of FIG. 1 outputs a device ID of a memory compatible with a host system.

FIG. 2 is a flowchart illustrating a procedure in which a memory card of FIG. 1 outputs a device ID of a memory compatible with a host system. As illustrated in FIG. 2, initially, the command detection section 4 detects a command signal output from the host system 10 to the memory card 1 (step S1). Then, the command detection section 4 determines whether or not the detected command signal is an ID transmission request command (step S2). Steps S1 and S2 are repeated until the command detection section 4 determines at step S2 that a detected command signal is the ID transmission request command (i.e., until the command detection section 4 receives an ID transmission request command).

By setting the chip enable signal CE#, the write enable signal WE#, and the output enable signal OE#, which are output from the host system 10, to an active state (low level), an active state (low level), and an inactive state (high level), respectively, the component memory section 2 is placed into a readable state (a "read array mode"). In such a state, the host system 10 outputs an ID transmission request command, 9090H, to the data bus DB. The command detection section 4 detects the ID transmission request command 9090H.

When the ID transmission request command is received by the command detection section 4 (i.e., when the command detection section 4 determines at step S2 that the detected command signal is the ID transmission request command), the ID output section 54 is permitted to use the data bus DB (step S3). That is, when the command detection section 4 detects the device ID transmission request command 9090H, the command detection section 4 outputs the output enable control signal OEC# (low level) to the ID control section 5 and the OR gate 41 within the output conversion section 7. The OR gate 41 converts the output enable signal OEC# (low level) into the output enable signal OE#' (high level, i.e., inactive state) and outputs it from an output terminal to the component memory section 2. This operation prevents the component memory section 2 from outputting data to the card control section 3 through the data bus DB' and simultaneously permits the ID control section 5 to output data through the data bus DB.

In such a state, the ID control section 5 transmits a device ID, which is selected according to the type of host system 10 during the production process, through the data bus DB (step S4). That is, the ID control section 5 transmits, from the ID output section 54 to the host system 10 through the data bus DB, a device ID which is selected, based on the setting of the ID setting switch 53, by the select circuit 52 in the ID control section 5 from the device IDs in the ID table 51.

After the transmission of the device ID, the operation of the memory card 1 is switched such that the component memory section 2 (IC memory section) uses the data bus DB (step S5).

Figure 3:
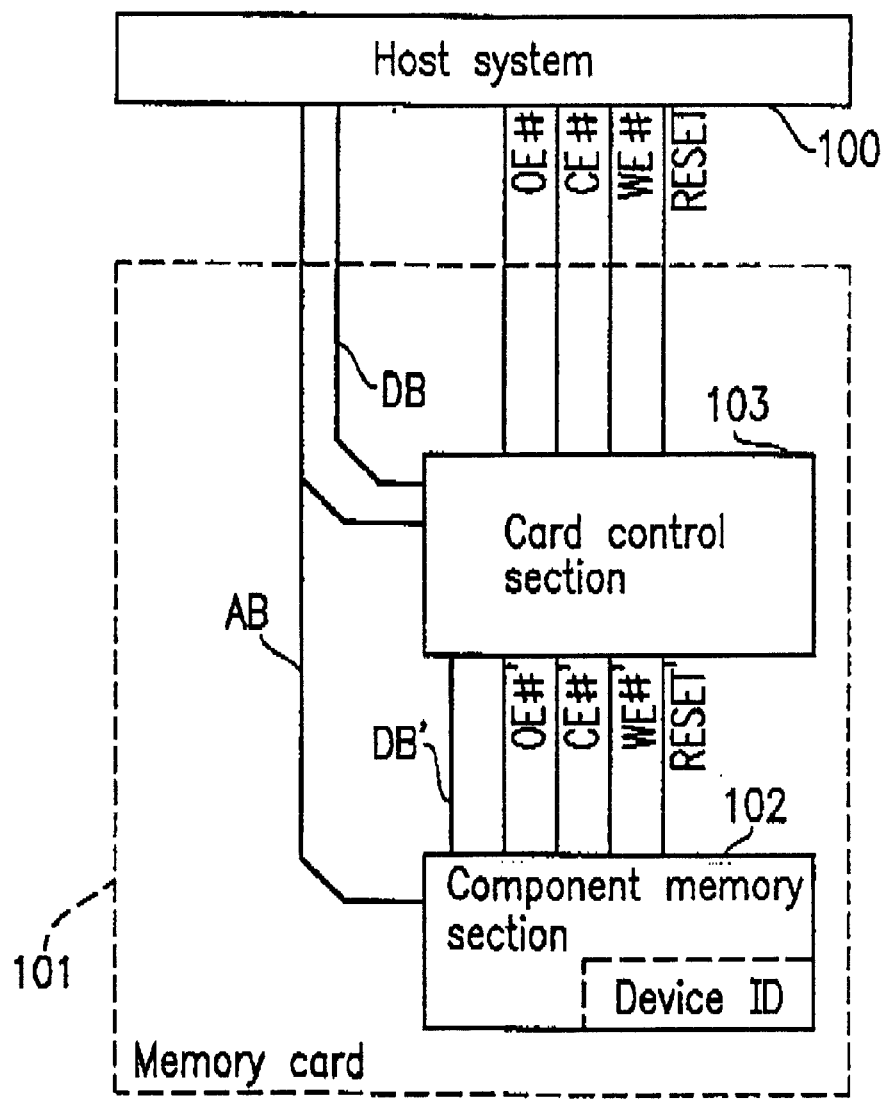
FIG. 3 is a block diagram illustrating a first exemplary configuration of a conventional memory card.

The host system 10 outputs other command signals, such as a reset command FFFFH, a status register read command 7070H, a status register clear command 5050H, a deletion set-up command 2020H, a deletion command D0D0H, a write set-up command 4040H, a write command 1010H, etc., in addition to the ID transmission request command 9090H described above. When the host system 10 outputs any one of the above described command signals other than the ID transmission request command 9090H, or when the memory card 1 is provided with a reset terminal 6 (FIG. 1) and a reset signal RESET input to the reset terminal 6 is in an active state (some memory cards are put into an active state by a high-level signal, and other memory cards are put into an active state by a low-level signal), the output enable control signal OEC# is at a high level, and the OR gate 41 converts the output enable signal OE#' to be input to the component memory section 2 into a state which activates the component memory section 2 (the output enable signal OE#' is pulled to a low level by the OR gate 41 due to the output enable signal OE# output from the host system 10), so that output from the ID output section 53 in the ID control section 5 is prohibited. Therefore, the operation of the component memory section 2 with respect to the host system 10 is the same as that in the conventional memory card 101 shown in FIG. 3.

As described above, according to the memory card 1 of the present invention, the same device ID as that of the host system 10 used by a user is stored in the ID table 51 of the memory card 1, such that, the host system 10 does not determine that the memory card 1 is not compatible therewith. Thus, the structure of the memory card 1 according to the present invention solves the problem described in conjunction with the conventional memory card 101 illustrated in FIG. 3, i.e., the host system 100 determines that the memory card 101 is not compatible with the host system 100 just because the device ID of the memory card 101 is different from a device ID preregistered in the host system 100 although the memory card 101 has compatibility of an algorithm with the host system 100.

In the memory card 1 of the present invention, the ID table 51 is set such that the device IDs of the host system 10 and the memory card 1 never fail to match. Thus, it is always determined that the memory card 1 is compatible with the host system 10, such that the memory card 1 can be used with the host system 10.

As described above, the host system 10 always determines without fail that the memory card 1 is compatible with the host system 10, and thus it is not necessary to update software or to modify a device in the host system 10. For example, assume a network including a base (hub) station and relay stations distributed in various places around the base station where each of the base station and the relay stations has an information processing device (host system) for communication over the network. In this network, it costs a great amount of money, energy, and time to update and modify each of the host systems used at the stations. Therefore, the same host system would be used for a long time. As a result, specifications of a memory card used with the host systems would also be unchanged for a long time. However, when a memory card includes a memory such as a flash memory, in consideration of increasing competitiveness in the market, the memory card is required to include a memory device of the latest model with good cost performance. Thus, such a memory card may not be used for a long time. In the case where memory cards usable with the host systems are standardized during a production process of the memory cards, the production cost and the turnaround time (TAT) of the memory cards can be decreased.

According to the present embodiment, the select circuit 52 selects a device ID from a plurality of device IDs stored in the ID table 51 which is, for example, formed of a mask ROM, an EEPROM, a flash ROM, etc., and the selected device ID is transmitted to the ID output section 54 in the form of parallel data. However, the present invention is not limited to this example. For example, a nonvolatile memory, such as a serial EEPROM, may be used as an input section of the select circuit 52. In this case, data is processed in the input section such that serial data is converted into parallel data. Thereafter, the parallel data is transmitted to the ID output section 54.

Figure 4:
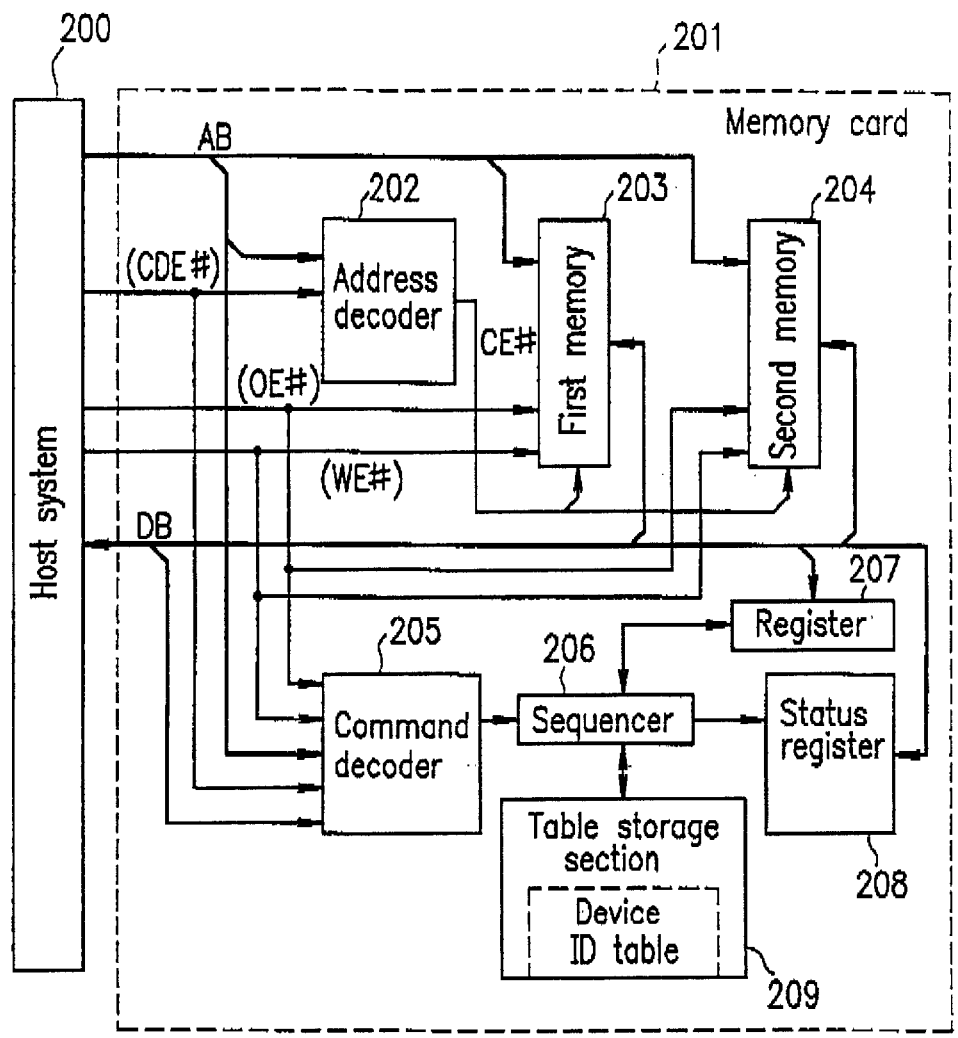
FIG. 4 is a block diagram illustrating a second exemplary configuration of a conventional memory card.

The present embodiment uses a device ID as an identification code, but the present invention is not limited thereto. The identification code may be a code number or any signal other than a device ID. For example, when a memory card of the present invention is used with the conventional host system 200 described in conjunction with FIG. 4, the memory card 1 is notified by the host system 200 of device IDs of memory devices compatible with the host system 200. The memory card 1 determines whether or not the notified device ID exists in the device ID table in the memory card 1 and outputs the determination result signal (which represents presence/absence of the device ID) to the host system 200. The determination result signal may also be output to the host system 200 as an identification code. In such a case, with the configuration of the present invention, the command detection section 4 detects the device IDs output from the host system 200. The ID table 51 only needs to store the determination result signal (which represents presence of the device ID).

As described above, a conventional memory card including a memory, which has compatibility of an algorithm with a memory compatible with a host system, but which does not have an identification code identical to that registered in the host system can not be used with the host system. However, according to the present invention, in response to an identification code (device ID) transmission request command which is input from the host system to the memory card, the memory card outputs to the host system an identification code which indicates compatibility of the memory card with a host system other than an identification code (e.g., device ID) preregistered in the memory card (e.g., in a component memory section). With such an arrangement, the memory card can let the host system recognize that the memory is compatible with the host system. Therefore, the memory card can be used with the host system without changing software or hardware in the host system even if the memory used in the memory card becomes an out-of-date product along with developments in the design and production of the memory.

Furthermore, by detecting the identification code transmission request command, it is possible to readily switch an output operation between the component memory section and the host system to an output operation between the identification code control section and the host system. Therefore, when the command detection section detects the identification code transmission request command, an identification code stored in the identification code control section which indicates the compatibility with the host system can be automatically output to the host system instead of outputting an identification code (e.g., device ID) stored in the component memory section to the host system.

Furthermore, according to the present invention, the memory card may prestore identification codes (e.g., device IDs) which indicate compatibility of the memory card with host systems in an identification table so as to selectively obtain an identification code desired by a user from the identification table.

Furthermore, a memory card of the present invention may readily select a desired identification code corresponding to a host system to be used from a plurality of identification codes stored in an identification code table using a select circuit so as to output the selected identification code to the host system.

Further still, according to the present invention, various identification codes (e.g., device IDs) in which each identification code includes a manufacturer code and a device code of a memory, may be prestored in an identification table, depending on a host system to be used, during production process, etc.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A memory card connected to a host system, comprising:
   a command detection section for detecting an identification code transmission request command which is input from the host system;
   an identification code control section for outputting to the host system, in response to a detection signal output from the command detection section, a predetermined identification code which indicates compatibility of the memory card with the host system,
   a component memory section for storing a device ID; and
   an output conversion section for outputting, in response to the detection signal output from the command detection section, an output prohibition signal which prohibits the component memory section from outputting data.

2. A memory card according to claim 1, wherein the identification code control section includes:
   an identification code table for storing the predetermined identification code; and
   an identification code output section for outputting the predetermined identification code stored in the identification code table to the host system.

3. A memory card according to claim 1, wherein the identification code control section includes:
   an identification code table for storing a plurality of identification codes;
   a select circuit for selecting one of the plurality of identification codes stored in the identification code table; and
   an identification code output section for outputting the identification code selected by the select circuit to the host system.

4. A memory card according to claim 1, wherein the identification code includes a manufacturer code and a device code.

* * * * *